Patented Aug. 19, 1952

2,607,792

UNITED STATES PATENT OFFICE 2,607,792

METHOD OF PREPARING DIMETHYL-POLYSILOXANE DIOLS

Earl Leathen Warrick, Pittsburgh, Pa., assignor to Dow Corning Corporation, Midland, Mich., a corporation of Michigan No Drawing. Application April 27, 1949, Serial No. 90,039

2 Claims. (Cl. 260—448.2)

This invention relates to a method of preparing dimethylpolysiloxane diols.

In the past, two general methods have been employed to synthesize diorganopolysiloxane diols. These are hydrolysis of diorganohalogeno silanes of the type $R_2SiX_2$ and the neutralization of diorganopolysiloxane salts of the type $$MO(R_2SiO)_xM$$

Neither of these methods have proved satisfactory for the preparation of dimethylpolysiloxane diols.

It is an object of this invention to provide a feasible method for the commercial production of dimethylpolysiloxane diols. Other objects and advantages will be apparent from the following description.

In accordance with this invention a completely condensed dimethylpolysiloxane is heated in contact with steam at a temperature of from 200° C. to 400° C. at a pressure above atmospheric.

Completely condensed dimethylpolysiloxanes and methods of preparing them are well-known in the art. The term "completely condensed" as used herein means that the siloxanes contain no detectible amount of silicon bonded hydroxyl groups as determined by such methods as the Zerewitinoff and infra-red analysis.

The siloxanes employed in the method of this invention may range in degree of polymerization from hexamethylcyclotrisiloxane to extremely high polymers which are soft, non-flowing solids at room temperature. When these polymers are heated in the presence of water under the conditions shown above, scission of the siloxane linkages takes place to form a mixture of dimethylpolysiloxane diols of the type $HO[(CH_3)_2SiO]_xH$ where $x$ has an average value of from 5 to 61.

The compositions produced by the method of this invention consist of a mixture of dimethylpolysiloxane diols along with some cyclic dimethylsiloxanes. These may be separated by distillation. In all cases the composition of the reaction products is such that they contain between 8.7 percent and 0.75 percent by weight silicon bonded hydroxyl groups.

Reaction between dimethylpolysiloxanes and steam under the above conditions will take place to form dimethylsiloxane diols when the amount of water as steam is in amount above 1.6 mol percent water based on the siloxane employed. However, it is preferred that the water and siloxane be used on a substantially equimolar basis. In this invention mols of siloxane is based upon the formula weight of the unit $(CH_3)_2SiO$. No improvement of yields has been found in departing from the ratio of one mol water to one mol siloxane. When the amount of water employed is above 4 mols of water per mol of siloxane there is a tendency for methyl groups to be cleaved from the silicon atoms. This tendency can be entirely prevented by adding 10 percent by weight glacial acetic acid to the reaction mixture or by saturating the mixture with $CO_2$.

Optimum temperatures for the reaction has been found to be from 200° C. to 400° C. Generally from 3 to 12 hours at these temperatures is sufficient. The reaction is carried out at a minimum pressure of 225 p. s. i. The precise pressure employed will be determined by the temperature.

The dimethylpolysiloxane diols of this invention are liquids ranging in viscosity from 5 cs. to 90 cs. at 25° C. The diols are of sufficient stability to be distilled at temperatures up to 250° C. without appreciable condensation. They are not affected by ammonium hydroxide but condense readily in the presence of a strong acid such as HCl and a strong alkali such as KOH.

The products of this invention are of use in the formation of aqueous siloxane emulsions which may be employed in many ways such as for example mold release agents and water proofing agents.

The following examples are illustrative of this invention.

Example 1

A mixture of 93 grams of hexamethylcyclotrisiloxane and 22.6 grams of water was heated in a bomb for 250° C. for five hours. The fluid reaction product was placed in a molecular still and the still was operated at a temperature of 30° C. at a pressure of 10 microns. Cyclicdimethylsiloxanes were removed. The temperature was then raised and the compounds having the compositions and properties shown in the table below, were obtained.

| Temp. in °C. | Weight in grams | Specific Refraction | Percent OH | Composition of Mixture |
|---|---|---|---|---|
| 100 | 19 | 0.2489 | 9.1 | $HO[(CH_3)_2SiO]_{5.5}H$ |
| 150 | 13 | 0.2497 | 4.3 | $HO[(CH_3)_2SiO]_{10.4}H$ |
| Residue | 36 | 0.2502 | 2.5 | $HO[(CH_3)_2SiO]_{18.1}H$ |

Example 2

A one liter Monel bomb was charged with 200 grams of a dimethylsiloxane which was in the form of a non-flowing pasty mass. 46 grams of water were added and the mixture was heated at 300° C. for three hours. The charge was quenched with ice water. The reaction product was a liquid having a viscosity of 48 ccs. at 25° C. which liquid was composed of a mixture of dimethylpolysiloxane diols.

*Example 3*

740 grams of a completely condensed 1000 cs. dimethylpolysiloxane fluid and 180 g. of water were placed in a 4.5 liter rocker bomb and heated at a temperature of 350° C. for 5 hours. The maximum pressure obtained was 1000 p. s. i. The bomb was allowed to cool and there was no residual pressure. The reaction product was a liquid polysiloxane containing dimethylpolysiloxane diols and having a viscosity of 20 cs. at 25° C. and a hydroxyl content of 2.52 percent by weight.

*Example 4*

740 grams of a 1000 cs. completely condensed dimethylpolysiloxane fluid and 180 grams of water were placed in a 4.5 liter rocker bomb and heated at a temperature of 300° C. for 12 hours. The maximum pressure obtained was 950 p. s. i. The reaction product thus obtained had a viscosity of 25.4 cs. and a hydroxyl content of 2.5 percent. The mixed dimethylpolysiloxane diols were then distilled at 250° C. and a pressure of 1 to 2 mm. The dimethylpolysiloxane diol distillate thereby obtained had a viscosity of 9.5 cs. and a hydroxyl content of 3 percent by weight. The residue was a mixture of dimethylpolysiloxane diols having a viscosity of 79.1 cs. and a hydroxyl content of 0.75 percent.

That which is claimed is:

1. The method of preparing dimethylpolysiloxane diols which comprises heating a mixture consisting essentially of a completely condensed dimethylpolysiloxane and steam in amount of at least 1.6 mol percent steam based on the siloxane, at a temperature of from 200° C. to 400° C. at a pressure above atmospheric whereby a mixture of dimethylsiloxane diols of the type $$HO[(CH_3)_2SiO]_xH$$

where $x$ has an average value from 5 to 61, is obtained.

2. The method of preparing dimethylpolysiloxane diols which comprises reacting a mixture consisting essentially of a completely condensed dimethylpolysiloxane and steam in amount of about 1 mol of steam per mol of siloxane, by heating them at a temperature of from 200° C. to 400° C. at a pressure above atmospheric, whereby dimethylsiloxane diols of the type $HO[(CH_3)_2SiO]_xH$, where $x$ has an average value from 5 to 61, are obtained.

EARL LEATHEN WARRICK.

REFERENCES CITED

The following references are of record in the file of this patent:

UNITED STATES PATENTS

| Number | Name | Date |
| --- | --- | --- |
| 2,371,050 | Hyde | Mar. 6, 1945 |
| 2,415,389 | Hunter | Feb. 4, 1947 |
| 2,480,620 | Warrick | Aug. 30, 1949 |